United States Patent
Morandi

(10) Patent No.: US 10,543,822 B2
(45) Date of Patent: Jan. 28, 2020

(54) METHOD OF AND APPARATUS FOR CONTROLLING VEHICLE BRAKING

(71) Applicant: CNH Industrial America LLC, New Holland, PA (US)

(72) Inventor: Gabriele Morandi, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 11 days.

(21) Appl. No.: 15/762,800

(22) PCT Filed: Sep. 22, 2016

(86) PCT No.: PCT/EP2016/072525
§ 371 (c)(1),
(2) Date: Mar. 23, 2018

(87) PCT Pub. No.: WO2017/050885
PCT Pub. Date: Mar. 30, 2017

(65) Prior Publication Data
US 2018/0265064 A1   Sep. 20, 2018

(30) Foreign Application Priority Data
Sep. 24, 2015 (IT) .............................. UB2015A3870

(51) Int. Cl.
*B60T 13/22* (2006.01)
*B60T 1/06* (2006.01)
*B60W 10/196* (2012.01)

(52) U.S. Cl.
CPC .............. *B60T 13/22* (2013.01); *B60T 1/062* (2013.01); *B60T 1/065* (2013.01); *B60W 10/196* (2013.01)

(58) Field of Classification Search
CPC ...... B60T 1/062; B60T 13/22; B60W 10/196; B60W 30/18109
See application file for complete search history.

(56) References Cited

U.S. PATENT DOCUMENTS 3,526,302 A   9/1970   Grant et al.
4,456,106 A * 6/1984 Schneider .............. B60K 23/06
                                                          477/171
(Continued)

FOREIGN PATENT DOCUMENTS

GB   2 319 573 A   5/1998

OTHER PUBLICATIONS

Notification of Transmittal of the International Search report and the Written Opinion of the International Searching Authority, or the Declaration dated Dec. 6, 2016 for International Application No. PCT/EP2016/072525 (11 pages).

*Primary Examiner* — Bradley T King
(74) *Attorney, Agent, or Firm* — Rickard K. DeMille; Rebecca L. Henkel

(57) ABSTRACT

A method of controlling deceleration of a vehicle which includes the steps of sensing the speed of rotation of the output shaft and generating an output shaft speed signal. The method also includes deriving from the output shaft speed signal a deceleration signal indicative of deceleration of the vehicle, and generating in accordance with a selectively effective feedback control scheme a braking command. The method further includes using the output shaft speed signal to calculate a maximum braking power signal and modulating the braking command in dependence on the maximum braking power signal in order to limit the braking power applied in the SAHR brake. The maximum braking power signal is determined in dependence on the heat dissipating capacity of the SAHR brake and is such as to give rise to a constant or approximately constant value of braking power dissipated in the SAHR brake.

14 Claims, 2 Drawing Sheets

(56) References Cited

U.S. PATENT DOCUMENTS

| | | | | |
|---|---|---|---|---|
| 4,538,228 A | * | 8/1985 | Brearey | B60T 8/1705 |
| | | | | 303/122.09 |
| 5,190,123 A | * | 3/1993 | Hvolka | B60T 1/062 |
| | | | | 188/170 |
| 5,288,140 A | | 2/1994 | Shikata | |
| 5,680,917 A | * | 10/1997 | Bray | B62D 11/08 |
| | | | | 192/48.609 |
| 6,238,019 B1 | * | 5/2001 | Okazaki | B60T 8/3275 |
| | | | | 303/113.2 |
| 8,239,109 B2 | * | 8/2012 | Dunn | B60T 8/171 |
| | | | | 180/170 |
| 2004/0262994 A1 | * | 12/2004 | Baumann | B60T 17/221 |
| | | | | 303/155 |
| 2005/0052075 A1 | * | 3/2005 | Sabelstrom | B60T 10/02 |
| | | | | 303/3 |
| 2010/0078519 A1 | * | 4/2010 | Cahill | B60T 8/1703 |
| | | | | 244/111 |
| 2010/0206655 A1 | * | 8/2010 | Stilwell | B60T 1/062 |
| | | | | 180/370 |
| 2015/0329116 A1 | * | 11/2015 | Bulgrien | B60W 10/11 |
| | | | | 192/219.4 |

* cited by examiner

METHOD OF AND APPARATUS FOR CONTROLLING VEHICLE BRAKING

BACKGROUND OF THE INVENTION

The invention relates to a powered land vehicle including at least one spring-applied hydraulic release (SAHR) vehicle brake.

In such a brake first and second brake elements, mounted respectively on a rotatable part of the drive train of the vehicle such as a powered output shaft and a fixed part such as the vehicle frame are moveable between mutually engaged and separated configurations.

In the separated configuration the rotatable component is free to rotate, thereby permitting the transmission of drive from e.g. a diesel engine forming part of the vehicle to a ground-engaging member such as a wheel including a tyre. In the mutually engaged configuration the second element brakes rotation of the rotatable part supporting the first brake element with the result that the transmission of drive is resisted or prevented and therefore the vehicle as a whole is braked.

In almost all cases the second brake element is moveable towards and away from the first brake element. A resiliently deformable member such as a coil spring acts on the second brake element or on a member connected thereto in order to bias it into engagement with the first brake element. When the rotatable part of the drive train is an output shaft as aforesaid the first and second brake elements typically are the plates of a friction clutch.

The second brake element includes or is connected to a piston in a chamber having a connection to a hydraulic control circuit that is capable of applying pressure to the piston and hence indirectly to the second brake element itself. The hydraulic control circuit is selectively capable of being energised in order to assure separation of the first and second brake elements under normal circumstances. As a result the rotatable element is maintained able to rotate most of the time.

When the vehicle operator selects the brake function however control elements connected to the hydraulic control circuit cause venting of the fluid pressure acting on the piston. This in turn permits the resiliently deformable spring to urge the second brake element into engagement with the first, whereby application of the SAHR brake occurs in order to brake the vehicle regardless of the output of the engine or operative status of a variable-ratio transmission forming part of the drive train of the vehicle.

The SAHR vehicle brake serves primarily as a park brake that is intended reliably to brake the vehicle when it is stationary, whether the engine of the vehicle is running or not. The design of the SAHR lends itself to this use because the presence of the resiliently deformable spring maintains the vehicle in a braked condition even when the engine is switched off.

When as described the first brake element is an output shaft it is known to include additional control components that operate to disengage one or more drive clutches when the SAHR brake activates. This prevents the SAHR brake from having to work against the torque of the vehicle engine. In such a case the SAHR brake acts on a part of the output shaft that lies downstream, in the drive train, from any clutch permitting disengagement of drive.

SAHR vehicle brakes typically are fitted in large, powered land vehicles such as tractors, combine harvesters, forage harvesters and other harvesting machines, excavators, bulldozers, utility vehicles such as farm loaders and multipurpose farm vehicles, mobile cranes, and similar vehicles that while designed to perform specialised tasks usually in off-road situations nonetheless are intended to travel on roads between work sites. SAHR vehicle brakes are required in such vehicles to provide for operator and third party safety in both on-road and off-road situations. The invention is of utility in all vehicles of the general kind listed above, together with numerous further vehicle types.

As indicated the braking systems of large vehicles of the general category indicated typically are electrohydraulic or electropneumatic and therefore consist of braking elements the mutual engagement and separation of which are under the control of one or more hydraulic or pneumatic circuits. These circuits include circuit components such as valves the operating states of which are alterable between two or more configurations through the action of electrically powered elements such as solenoids that move moveable parts of the valves from one position to another.

Even though as mentioned it is known to provide for the disengagement of drive clutches in the drive train including the output shaft of such a vehicle, the duty of an SAHR brake that acts on an output shaft is extremely demanding. This is because even when freewheeling and not being driven under power the enormous masses of vehicles as listed above mean it requires considerable braking power to arrest them by braking their output shafts.

A disadvantage of braking a heavy vehicle in the manner described is that the heat generated in the SAHR brake can exceed the cooling capacity of any brake cooling system (that typically consists of a lubricant supplied to parts of the SAHR brake). When this happens damage may occur to the brake parts, shortening their service lives or even leading to failure of the SAHR brake.

As noted the SAHR brake normally is applied as a parking brake but under some (typically emergency) circumstances may be required to brake a moving vehicle. In such situations the vehicle may be moving at a considerable speed of up to e.g. 40 km/h (being the legal speed limit for tractors towing trailers in many EU countries) or even 80 km/h (being the actual maximum speed that some tractor and other agricultural vehicle designs can attain when not towing trailers).

In view of the foregoing there is a need in the art for improvements in SAHR brake performance, especially in cases in which the SAHR brake is arranged to act on an output shaft. The invention seeks to solve or at least ameliorate one or more drawbacks of prior art arrangements.

SUMMARY OF THE INVENTION

According to the invention in a first broad aspect there is provided a method of controlling deceleration of a vehicle including a rotatable output shaft and an SAHR brake having a pair of friction braking components that in response to a braking power request are mutually engageable to brake the output shaft, the method including the steps of sensing the speed of rotation of the output shaft and generating a deceleration signal indicative of deceleration of the vehicle; as needed generating in accordance with a selectively effective feedback control scheme a braking command based on the output shaft speed signal, the deceleration signal and the braking power request; and using the braking command to control the engagement of the friction braking components, wherein the method includes using the output shaft speed signal to calculate a maximum braking power signal and modulating the braking command in dependence on the maximum braking power signal in order to limit the braking power applied by the SAHR brake.

Such an arrangement beneficially limits the braking power required to be dissipated in the SAHR brake, and hence limits the heat generated in the brake to a level that the brake cooling system can accommodate. This in turn reduces the risk of damage to the SAHR brake and prolongs the service lives of its parts.

For the avoidance of doubt the invention includes the step of feeding the modulated braking command to control the engagement of the friction braking components.

In a preferred embodiment of the invention the method includes generating an output shaft speed signal; and deriving from the output shaft speed signal a deceleration signal indicative of deceleration of the vehicle.

Preferably in accordance with the method of the invention the maximum braking power signal is determined in dependence on the heat dissipating capacity of the SAHR brake. This may advantageously be pre-programmed as a parameter in firmware in a controller controlling operation of the method of the invention.

Conveniently the maximum braking power signal is such as to give rise to a constant or approximately constant value of braking power applied by the SAHR brake. This advantageously ensures that the cooling capacity of the SAHR brake is not exceeded.

The mathematical basis of the calculations required to generate the maximum braking power signal is essentially arithmetic and straightforward. The calculations therefore can be processed using a relatively small amount of processing power in a programmable device such as a vehicle brake control microprocessor.

Further preferably the step of sensing the speed of rotation of the output shaft includes the use of an output shaft speed sensor; the method including monitoring the status of the output speed sensor; and in the event of detection of an output speed sensor fault, deselecting (ceasing) feedback control scheme operation and operating the SAHR brake in accordance with an open loop control scheme omitting a maximum braking power signal.

Such a refinement advantageously takes account of the possibility of failure or inaccuracy of the output shaft speed sensor. Such sensors are sometimes subject to harsh conditions in vehicles of the various kinds referred to above, and therefore may be subject to failure. Moreover in some designs of vehicle such as certain tractors or other agricultural vehicles the speed sensor takes the form of a radar Doppler device. These sensors can become inaccurate when used in conjunction with some road and ground surface conditions, in particular of a kind promoting wheel slipping. In such circumstances the use of feedback control can give rise to errors in the modulation of the brake command signal in turn leading to inefficient braking.

This can be inconvenient or possibly dangerous (for example if the vehicle is approaching a solid object at the time the SAHR braking command is generated). At such times therefore it is beneficial for the method of the invention to include switching to an open loop control philosophy in which there is less risk of the vehicle becoming underbraked.

One way of embodying fault-detection technology in the context of the invention involves the provision of one or more diagnostic sensors in the vehicle driveline, that recognises e.g. an open circuit, unwanted grounding, shorting to the vehicle battery and similar fault situations through the detection of an out-of-range voltage in electrical components forming part of the driveline. Such electrical components may include e.g. a Hall-effect sensor that is positioned to sense the rotational speed of the output shaft by interaction in a per se known manner with a toothed flywheel.

The speed of the output shaft also can be detected using e.g. an optical sensor and another form of toothed flywheel, again in a per se known manner.

Further for the avoidance of doubt, conveniently when the method operates in open loop mode as described it includes the step of feeding the maximum braking power signal forwardly to control the engagement of the friction braking components in accordance with the open loop control scheme without modulating the braking command.

In addition to the foregoing the invention is considered to reside in a vehicle including a powered, rotatable output shaft and an SAHR brake having a pair of friction braking components that are mutually engageable, in response to a braking power request, to brake the output shaft, the vehicle further including a sensor for sensing the speed of rotation of the output shaft and generating an output shaft speed signal; and one or more programmable devices that is programmed to carry out the steps of a method in accordance with the invention as defined herein.

In an alternative embodiment of the invention the output shaft speed sensor may be replaced by an accelerometer that directly generates a vehicle deceleration signal.

Preferably in such a vehicle the friction braking components are the plates of an output shaft clutch. Alternatively other designs of SAHR brake may be used, within the scope of the invention. However the invention is likely to be of greatest benefit in a SAHR brake in which the friction braking components are the plates of an output shaft clutch. Such a SAHR brake type is most likely to suffer from heat build-up, fade and heat-derived damage in the absence of the features of the invention.

The vehicle of the invention preferably includes a mass sensor the output signal of which is used to determine the deceleration when an output speed sensor is present. In an alternative embodiment of the invention however the vehicle mass, or an approximation thereto, may be programmed in firmware installed in the programmable device.

Conveniently in accordance with the invention the vehicle is configured as an agricultural vehicle including a diesel engine for powering the output shaft.

BRIEF DESCRIPTION OF THE DRAWINGS

There now follows a description of a preferred embodiment of the invention, by way of non-limiting example, with reference being made to the accompanying drawings in which.

DETAILED DESCRIPTION OF THE DRAWINGS

Figure 1:
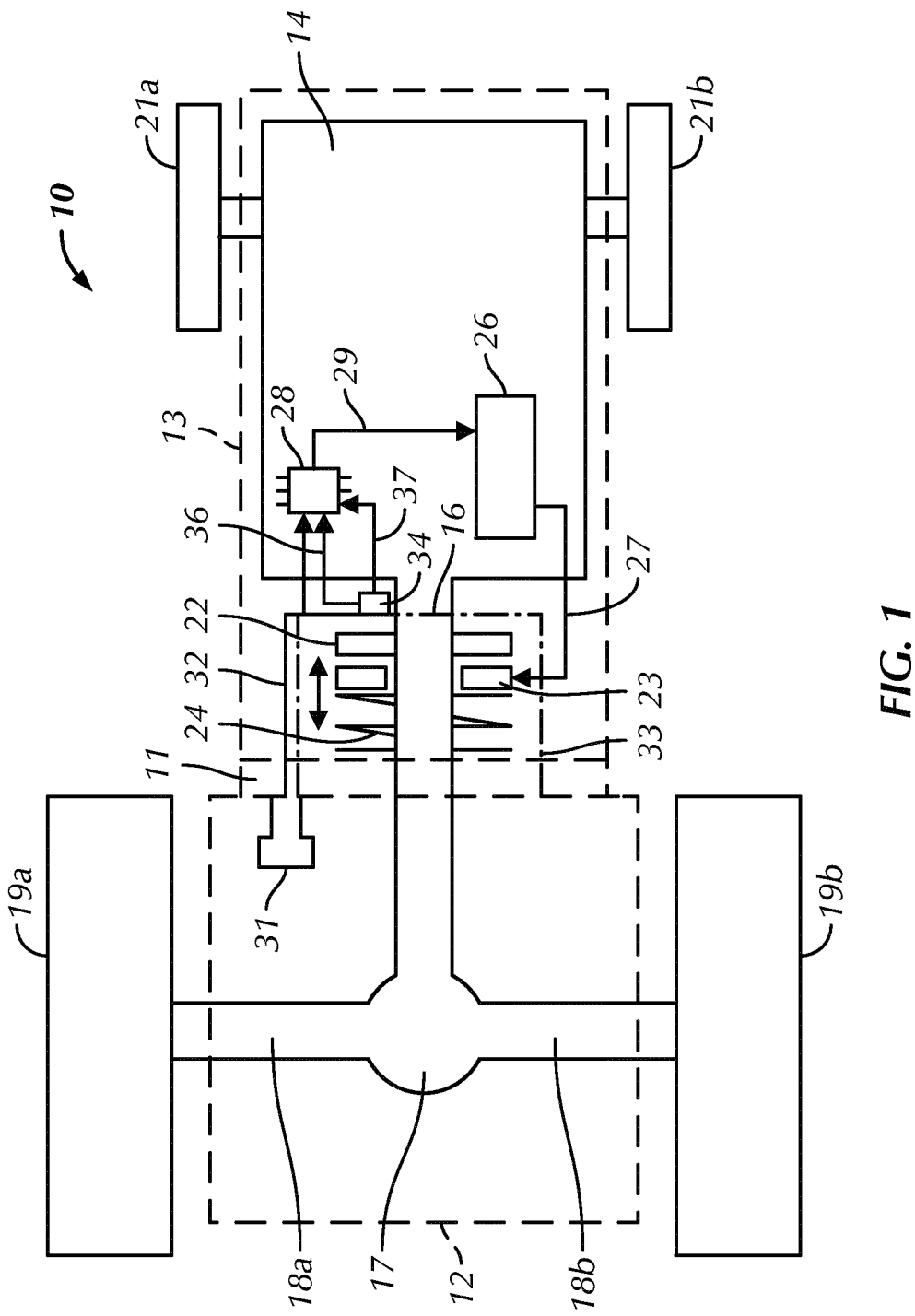
FIG. 1 is a schematic, partly-sectioned plan view of a vehicle according to the invention.

Referring to the drawings there is shown in schematic, plan view form a vehicle 10 according to the invention. Vehicle 10 in Figure is a tractor, although this need not be the case and the vehicle may be any of the kinds mentioned herein. As is well known a tractor includes many more parts than those shown in FIG. 1, which illustrates only the features of a tractor that are needed for an understanding of the invention.

To this end tractor 10 of FIG. 1 includes a vehicle frame 11 supporting a driver's cab 12, engine hood 13, and an engine 14 (that in virtually all cases is a diesel engine) connected to drive a drive train described in more detail below.

The primary components of the engine 14 and connected drive train are well known to the person of skill in the art and do not need to be described herein. Thus FIG. 1 omits conventional features of a vehicle drive train such as a fueling system, governor or throttle control, variable-ratio transmission and one or more drive clutches that serve selectively to engage and disengage drive generated in the engine via a rotatable output shaft 16.

As shown in FIG. 1 output shaft 16 transfers rotative drive from the engine 14 via a differential 17 supported under the cab 12 and respective left and right half shafts 18*a*, 18*b* to left and right rear ground-engaging wheels 19*a*, 19*b*. The wheels 19*a*, 19*b* are driven to rotate when the drive clutches in the drive train are engaged. As is commonplace in agricultural and several other types of off-road vehicle the rear wheels 19*a*, 19*b* are of relatively large diameter and are fitted with tyres having deep treads enabling traction of the vehicle 10 when it travels over muddy or otherwise soft ground.

The vehicle 10 additionally includes steerable front wheels 21*a*, 21*b*. When the vehicle 10 is constituted as a tractor as illustrated the front wheels 21*a*, 21*b* may be un-driven (i.e. freewheeling) wheels and may be of smaller diameter that the rear wheels 19*a*, 19*b*. However this need not necessarily be the case, and both driven and relatively large diameter ground-engaging front wheels 21*a*, 21*b* are known in the art of vehicles of the kinds mentioned herein.

It furthermore is not essential that the vehicle 10 is equipped with wheels 19, 21 at all; and it is within the scope of the invention for drive from the engine 14 to be transferred via the drive train e.g. to ground-engaging endless tracks secured on the left and right hand sides of the frame 11. In addition combinations of ground-engaging members are known, and thus it is possible to provide e.g. endless driven tracks at the rear of the vehicle and rotatable wheels at the front. All such variants are within the scope of the invention.

In addition to the drive clutches described above the drive train of the vehicle 10 is equipped with a SAHR brake that takes a clutch-like form as described below.

The SAHR brake thus includes a circular first clutch plate 22 that is supported by and keyed to output drive shaft 16 such that first clutch plate 22 rotates with the drive shaft 16.

A second clutch plate 23 encircles the output shaft 16 and is mounted so as to be bi-directionally moveable longitudinally along it as signified by the double-headed arrow in FIG. 1.

Second clutch plate 23 is located and dimensioned so as to be engageable with first clutch plate when it moves to the right in FIG. 1. A spring 24 or another type of resiliently deformable member acts between the second clutch plate and a non-rotatable part of the vehicle 10, such as part of the frame 11, tending to drive the second clutch plate 23 into engagement with the first clutch plate 22. A hydraulic control circuit represented schematically by numeral 26 selectively causes pressurised hydraulic fluid to act on second clutch plate 23, or more typically a chamber-mounted moveable piston secured to the second clutch plate 23, tending to oppose the action of the spring 24 and maintain the clutch plates 22, 23 separated from one another as illustrated in FIG. 1. In this condition the first clutch plate, and hence the output shaft 16 to which it is secured, is free to rotate.

The vehicle 10 includes typically a plurality of hydraulic lines 27 via which the foregoing effect is achieved.

The vehicle 10 includes at least one programmable device 28 that is represented schematically in FIG. 1 by an engine-mounted processor chip and that may in other embodiments of the invention adopt a wide range of other formats as will be known to the person of skill in the art.

The programmable device 28 may have multiple functions or may be dedicated to the provision of a limited range of control actions. One set of functions that the programmable device 28 deals with in the context of the invention is the generation of control commands affecting the statuses of e.g. valves, pumps, solenoids and/or switches forming part of the hydraulic control circuit so as to give effect to control demands placed on the SAHR brake. To this end the programmable device 28 is shown schematically connected to the hydraulic control circuit 26 by way of one or more electrical or electronic signal lines 29.

Although a hard-wired installation of the programmable device 28 is preferred, this need not necessarily be the arrangement. Thus in an alternative embodiment of the invention the programmable device 28 may be connected to controllable parts of the hydraulic control circuit 26 wirelessly, using any of a number of "near field communication" (NFC) protocols.

The programmable device 28 moreover may take a range of forms other than the processor chip illustrated; it may exist as multiple components; and it need not be permanently or even temporarily located in the vehicle 10.

The SAHR brake of the vehicle 10 includes a driver-operated control member for initiating braking by way of engagement of the first and second clutch plates 22, 23. In the illustrated embodiment the control member takes the form of a moveable foot pedal 31 that the driver of the vehicle may actuate. In other embodiments the control member may be embodied as e.g. a lever, rotary knob, touch screen icon or pushbutton. The vehicle 10 may optionally include multiple SAHR brake control members. When multiple SAHR brake control members are provided they need not be all of the same type.

The purpose of the foot pedal 31 or other control member as indicated is to initiate braking using the SAHR brake. Actuation of the foot pedal 31 generates a signal that typically is an electrical signal fed via one or more electrical or electronic signal lines 32 to the programmable device 28. The signal fed via the signal line(s) 32 is a percentage deceleration request. The programmable device 28 converts this to a braking command in the form of a deceleration request that is fed via signal line(s) 29 to the components of the hydraulic circuit. The latter adjust the pressure of hydraulic fluid acting on the second clutch plate 23 or more typically a piston connected to it such that the first and second clutch 22, 23 plates become pressed together in proportion to the percentage deceleration request.

This in turn causes braking of the output shaft 16 by reason of friction between the clutch plates 22, 23. Braking of the output shaft 16 causes braking of the vehicle as a whole by reason of deceleration of the rear wheels 19*a*, 19*b*.

Typically the programmable device 28 at such a time commands disengagement of one or more drive clutches so that the SAHR brake is not working against the torque of the engine 14. This minimises the braking effort demanded of the SAHR brake, but despite this the braking duty required is very demanding since even when freewheeling a heavy vehicle such as a tractor, harvesting machine or other working vehicle exhibits very high kinetic energy that must be dissipated through the action of the SAHR brake. This is particularly true since the SAHR brake, the normal purpose of which is to act as a parking brake that is applied at very low or zero speeds of the vehicle 10, sometimes is required to operate as an emergency brake.

This requirement may arise because of a detected failure of the hydraulic or pneumatic service brakes of the vehicle 10. As a result the SAHR brake may have to brake a very heavy vehicle that may be travelling at a speed of 50 km/h or more if the emergency braking requirement arises while the vehicle 10 is travelling on a road.

The first and second clutch plates 22, 23 typically are constituted as so-called "wet" clutch plates. In a wet clutch a fluid is circulated e.g. using impeller blades or a pump inside the housing 33 of the clutch. The fluid lubricates the clutch parts and in order to maximise the service lives of the clutch plates transfers away the heat that builds up in them. Despite these measures however the heat generated when the first and second clutch plates 22, 23 must brake a vehicle such as a tractor from a high speed often damages the clutch, shortening the useful lives of the clutch plates 22, 23 and potentially causing catastrophic clutch failure. For various reasons this can be a very serious situation.

The method of the invention as noted above seeks to solve this problem. The features giving rise to an advantageous solution are now described with reference to FIGS. 1 and 2.

Figure 2:
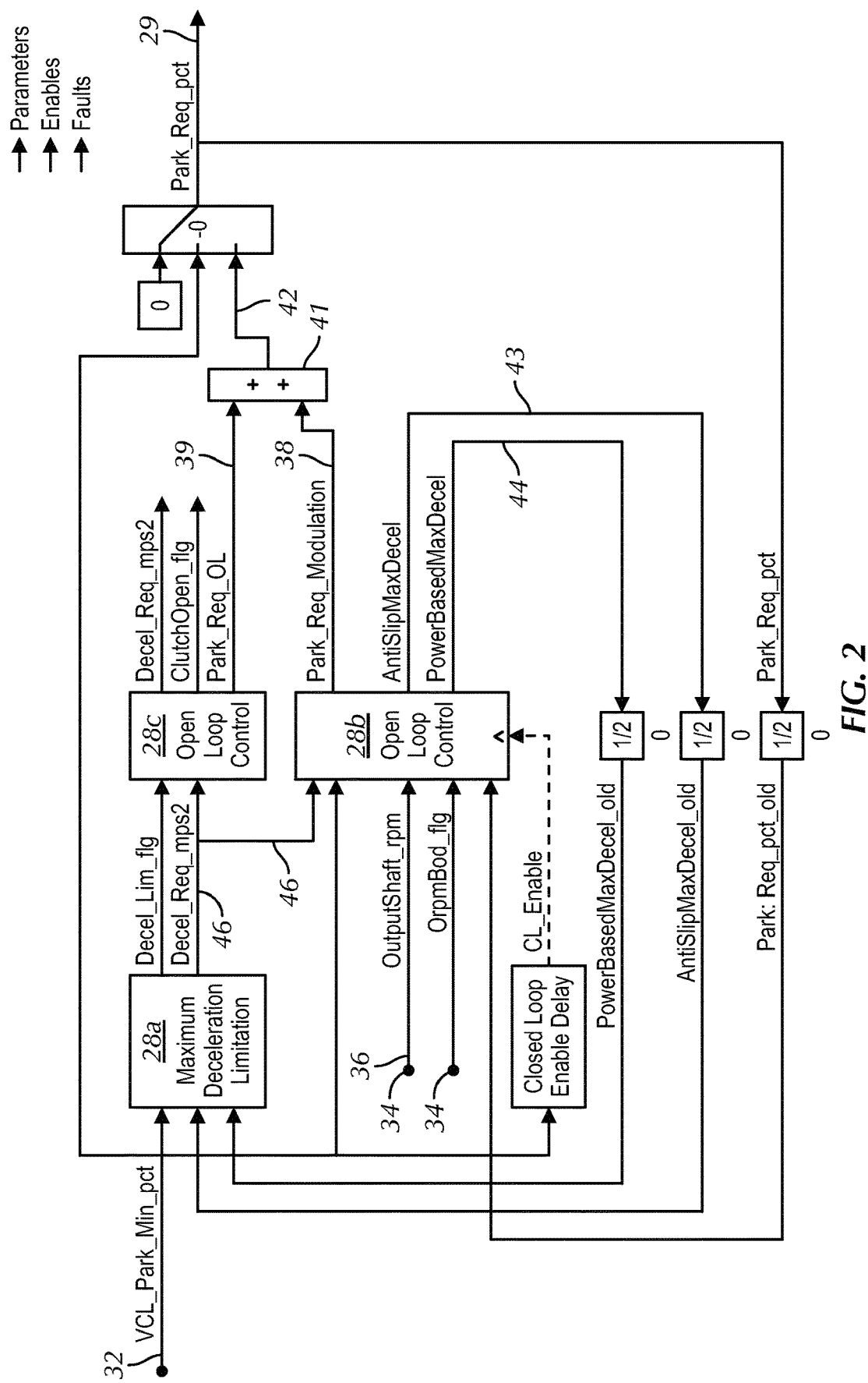
FIG. 2 is a schematic block diagram summarising the method of the invention as may be put into effect in a vehicle such as but not limited to the vehicle of FIG. 1.

In FIG. 2 the programmable device 28 is shown as constituting three sections 28a, 28b and 28c. These sections may be constituted by one and the same processor, or separate processors.

Section 28a of the programmable device operates continuously to generate a maximum deceleration signal 46 that is fed forwardly in the control regime. Section 28b is active when the programmable device operates in a feedback mode, as is the normal mode of operation of the embodiment described herein. Section 28b generates a modulating signal 38 that as described is used to modulate braking command deceleration request 39. Section 29c is active when the control is switched to an open-loop mode under circumstances described below.

In use of the vehicle 10 of FIG. 1 a braking power request is generated e.g. through depression of the foot pedal 31 or another control member, with the extent of depression etc. of the control member corresponding to the magnitude of the braking power request. As described this signal is transmitted via signal line 32 to the programmable device 28, which generates a braking command in accordance with the principles set out below.

The vehicle 10 of FIG. 1 in addition to the parts described above includes a sensor 34 that by way of electrical or electronic signal line 36 feeds to the programmable device 28 an output shaft speed signal that is indicative of the rotational speed of the output shaft 16. To this end the sensor 34 typically is a Hall-effect or optical sensor of a per se known kind that co-operates with a toothed wheel (sometimes called a tonewheel) attached to the output shaft for rotation therewith, although other types of sensor are possible within the scope of the invention.

The output of the sensor 34 may be used to determine the deceleration of the vehicle 10. The deceleration value is fed back to the portion 28a of the processor 28 as signified by signal line 43. The sensor 34 therefore provides for feedback control which the programmable device 28 may use to update the braking deceleration request signal in dependence on the actual deceleration of the vehicle. The vehicle 10 additionally is arranged to carry out novel control actions in accordance with the method of the invention.

In particular the programmable device 28 is programmed to calculate, in accordance with the method of the invention and more particularly taking account of the output of the sensor 34, a maximum braking power value. This is fed forward as a maximum braking power signal represented by line 38 in FIG. 2 in the closed loop control regime referred to above.

The maximum braking power value is determined in part based on the speed of the output shaft as detected by sensor 34, and in part on one or more e.g. firmware-programmed parameters relating to the heat dissipating capacity of the SAHR brake. It is also necessary to know the mass of the vehicle 10 in order to calculate the maximum braking power. The vehicle mass may be determined from a further sensor, or by adopting a conservative estimation approach of programming in to the firmware used by the processor 28 e.g. the Gross Vehicle Weight (GVW).

The heat dissipating capacity depends on the characteristics of lubricant system referred to above. Such characteristics include the pumping capacity of the lubricant system, and the physical (and especially thermal conductivity) properties of the lubricant.

The maximum braking power signal 38 is used to modulate the braking command (deceleration request) signal 39 such that the cooling capacity of the SAHR brake is not exceeded and therefore the problems outlined herein do not arise.

This maximum braking power signal 38 is used, as signified by adder/summing junction 41 in FIG. 2, to modulate the braking command 39. The result is a closed loop modulated braking command 42 that is fed via signal line 29 to control the condition of the hydraulic circuit 26 that is shown in FIG. 1.

The programmable device 28 is in the preferred embodiment of the invention shown programmed such that the braking power applied in the SAHR brake is, as closely as possible, a constant value.

The modulated braking command 39, a signal 43 calculated by the programmable device 28 and indicating the deceleration when an anti-slip mode is active, and a signal 44 indicative of the maximum deceleration when operating in accordance with the constant power deceleration mode described above are fed back in the feedback loop constituting the control regime as illustrated in FIG. 2.

As noted the output shaft speed sensor 34 may give inaccurate results, especially if the vehicle 10 is moving on slippery ground. The sensor 34 includes a faulty output detector that as described above generates a signal in fault signal line 37 in the event of detection of inaccurate data generated by the sensor 34.

At such a time the control switches from a closed-loop regime to an open-loop one that is signified by section 28c of programmable device 28 in FIG. 2. When operating in such a mode the braking command deceleration request 39 is not modified by a maximum deceleration signal 38. The braking command deceleration request 39 in such circumstances therefore is transmitted to the hydraulic circuit 26 in an un-modulated form. This advantageously avoids the problem of inaccurate braking commands (and in particular under-braking of the vehicle 10) in the event of an inaccurate output of the sensor 34 arising.

Overall the method and vehicle of the invention address a significant problem, namely that of overheating of the SAHR brake in e.g. an emergency braking situation. Moreover the method of the invention adopts a constant braking power modulation model that provides for reliable, effective SAHR braking; and abandons the modulation step in the event of inaccuracies being detected in the signal of the output shaft that is used in the calculation of the modulating signal. At such a time the method switches to open-loop control which allows effective braking to continue without a danger of under-braking the vehicle.

The calculation of the vehicle deceleration need not be based on an output shaft speed sensor as indicated. As an alternative e.g. an accelerometer may be provided that gives a direct measure of deceleration without any need to differentiate a speed signal as in the preferred embodiment of the invention described above.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. A method of controlling deceleration, comprising the steps of:
    providing a vehicle including a rotatable output shaft, an SAHR brake having a pair of friction braking components that in response to a braking power request are mutually engageable to brake the output shaft, an output shaft speed sensor, and one or more programmable devices in communication with the SAHR brake;
    sensing, by the output shaft speed sensor, a speed of rotation of the output shaft;
    generating, by the output shaft speed sensor, an output shaft speed signal;
    deriving from the output shaft speed signal a deceleration signal indicative of deceleration of the vehicle;
    generating in accordance with a selectively effective feedback control scheme a braking command based on the output shaft speed signal, the deceleration signal, and the braking power request;
    using the braking command to control an engagement of the friction braking components;
    calculating, by the one or more programmable devices, a maximum braking power signal by using the output shaft speed signal, wherein the maximum braking power signal is determined in dependence on a heat dissipating capacity of the SAHR brake; and
    modulating the braking command in dependence on the maximum braking power signal in order to limit the braking power dissipated in the SAHR brake.

2. The method according to claim 1, wherein the method includes monitoring a status of the output shaft speed sensor; and wherein the method includes, upon detection of an output speed sensor fault, deselecting the feedback control scheme and operating the SAHR brake in accordance with an open loop control scheme in which the braking command is not modulated in dependence on the maximum braking power signal.

3. The method according to claim 1, further including a step of monitoring a speed of the vehicle and wherein upon detection of a vehicle speed below a threshold value, deselecting the feedback control scheme and operating the SAHR brake in accordance with the open loop control scheme in which the braking command is not modulated in dependence on the maximum braking power signal.

4. A method of controlling deceleration, comprising the steps of:
    providing a vehicle including a rotatable output shaft, an SAHR brake having a pair of friction braking components that in response to a braking power request are mutually engageable to brake the output shaft, an output shaft speed sensor, and one or more programmable devices in communication with the SAHR brake;
    sensing, by the output shaft speed sensor, a speed of rotation of the output shaft;
    generating, by the output shaft speed sensor, an output shaft speed signal;
    deriving from the output shaft speed signal a deceleration signal indicative of deceleration of the vehicle;
    generating in accordance with a selectively effective feedback control scheme a braking command based on the output shaft speed signal, the deceleration signal, and the braking power request;
    using the braking command to control an engagement of the friction braking components;
    calculating, by the one or more programmable devices, a maximum braking power signal by using the output shaft speed signal, wherein the maximum braking power signal is such as to give rise to a constant or approximately constant value of braking power dissipated in the SAHR brake; and
    modulating the braking command in dependence on the maximum braking power signal in order to limit the braking power dissipated in the SAHR brake.

5. The method according to claim 4, wherein the maximum braking power signal is determined in dependence on a heat dissipating capacity of the SAHR brake.

6. A vehicle, comprising:
    a rotatable output shaft;
    an SAHR brake including a pair of friction braking components that are mutually engageable in response to a braking power request to brake the output shaft;
    a sensor for sensing a speed of rotation of the output shaft and generating an output shaft speed signal; and
    one or more programmable devices configured for:
        deriving from the output shaft speed signal a deceleration signal indicative of deceleration of the vehicle;
        generating in accordance with a selectively effective feedback control scheme a braking command based on the output shaft speed signal, the deceleration signal, and the braking power request;
        controlling an engagement of the friction braking components using the braking command;
        calculating a maximum braking power signal by using the output shaft speed signal, wherein a mass of the vehicle is programmed in the one or more programmable devices and is used in the calculation of the maximum braking power signal; and
        modulating the braking command in dependence on the maximum braking power signal in order to limit the braking power dissipated in the SAHR brake.

7. The vehicle according to claim 6, wherein the sensor is configured for sensing a deceleration of the vehicle and the output shaft speed signal is in the form of an output deceleration signal.

8. The vehicle according to claim 7, wherein the friction braking components are clutch plates.

9. The vehicle according to claim 6, further including a vehicle mass sensor configured for providing an output which is used in the calculation of the maximum braking power signal.

10. The vehicle according to claim 6, wherein the vehicle is in the form of an agricultural vehicle further including a diesel engine for powering the output shaft.

11. The vehicle according to claim 6, wherein the maximum braking power signal is determined in dependence on a heat dissipating capacity of the SAHR brake.

12. The vehicle according to claim 6, wherein the maximum braking power signal is such as to give rise to a constant or approximately constant value of braking power dissipated in the SAHR brake.

13. A vehicle, comprising:
a rotatable output shaft;
an SAHR brake including a pair of friction braking components that are mutually engageable in response to a braking power request to brake the output shaft;
a sensor for sensing a speed of rotation of the output shaft and generating an output shaft speed signal; and
one or more programmable devices configured for:
deriving from the output shaft speed signal a deceleration signal indicative of deceleration of the vehicle;
generating in accordance with a selectively effective feedback control scheme a braking command based on the output shaft speed signal, the deceleration signal, and the braking power request;
controlling an engagement of the friction braking components using the braking command;
calculating a maximum braking power signal by using the output shaft speed signal, wherein the maximum braking power signal is determined in dependence on a heat dissipating capacity of the SAHR brake; and
modulating the braking command in dependence on the maximum braking power signal in order to limit the braking power dissipated in the SAHR brake.

14. The vehicle according to claim 13, wherein the maximum braking power signal is such as to give rise to a constant or approximately constant value of braking power dissipated in the SAHR brake.

* * * * *